३,११९,३६७
VISIBLE FILTER CLOGGING INDICATOR
Lloyd L. Barnes, Jr., and Paul G. Pace, Van Nuys, Calif., assignors to The Bendix Corporation, a corporation of Delaware
Filed Oct. 15, 1958, Ser. No. 767,386
11 Claims. (Cl. 116—70)

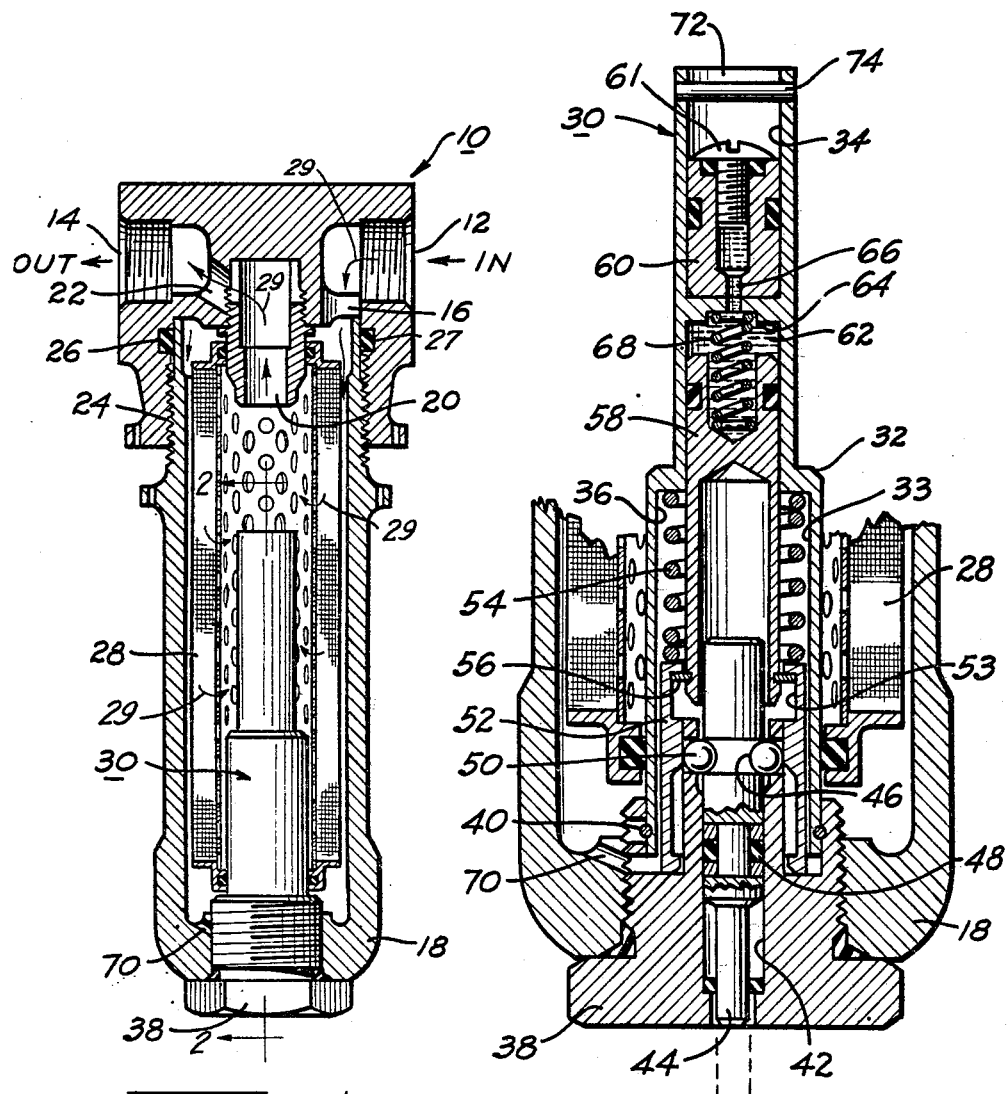

This invention relates to a visible filter clogging indicator and more specifically to a temperature sensitive differential pressure indicating device.

The use of various types of differential pressure indicating devices which sense changes in pressure drop across a filter element when the element becomes clogged, has long been known in the art. One of the faults, however, of many of these devices is that they do not incorporate lock-out devices, which are temperature controlled, for preventing false indicator readings at low temperatures. Such false indicator readings may occur at low temperatures because fluids at these temperatures are normally very viscous and extremely high pressure drops will occur across the filter element, causing the differential pressure indicator to indicate a clogged condition even though the filter element is clean.

Those few devices, which have included temperature controlled lock-out means for preventing false readings, have been relatively complex, and have often been somewhat bulky, requiring space in addition to that already required by the filter unit. Other devices have required isolation of the temperature sensing unit.

It is, therefore, an object of this invention to provide a simple differential pressure indicating device which will indicate a given differential pressure only at temperatures above a predetermined value.

Another object of this invention is to provide a small, compact, unitized temperature sensitive differential pressure indicating device which may be positioned within the filtering element so that it will not require additional space and will be immersed in the fluid being filtered in order to more accurately sense the temperature of the fluid.

Another object of this invention is to provide an indicator which will continue to indicate the clogged condition of the filter even after the apparatus with which the filter is associated has ceased to operate.

A further object of this invention is to provide a filter clogging indicator having a temperature sensitive locking mechanism which is incorporated into the pressure responsive means to render said means non-responsive at temperatures below a predetermined value.

More particularly it is an object of this invention to provide a temperature controlled differential pressure indicating device in which the temperature control is accomplished through the use of a confined fluid medium which solidifies at temperatures below a predetermined value and prevents movement of the differential pressure sensing means.

A still further object of this invention is to provide a differential pressure indicating device having pressure responsive means which include first and second movable members forming a chamber therebetween, a fluid medium confined in said chamber for transmitting motion from one of said members to the other, and means located in said chamber for preventing transmittal of such motion at temperatures causing said fluid medium to solidify.

Another object of this invention is to provide a readily observable temperature sensitive differential pressure indicating device which may be easily and inexpensively fabricated.

The above and other objects and features of the invention will become apparent from the following description of the mechanism taken in connection with the accompanying drawing which forms a part of this specification and in which:

FIGURE 1 is a longitudinal sectional view of a filter unit incorporating our visible filter clogging indicator; and FIGURE 2 is an enlarged sectional view of our filter clogging indicator taken along line 2—2 of FIGURE 1 and shown in conjunction with a portion of the filter unit.

Referring to FIGURES 1 and 2, numeral 10 indicates a filter head having an inlet port 12 and an outlet port 14 which communicate with each other via passage 16, fluid bowl 18, and passages 20 and 22 respectively. The bowl is secured in place to the lower side of head 10 by screw threads 24 and is sealed thereto in fluid tight relationship by an O-ring gasket 26 in an annular groove 27. A suitable filter element 28 is disposed in the fluid bowl in such a manner that fluid flowing between the inlet port 12 and the outlet port 14 will flow therethrough, as indicated by the arrows 29. Brackets (not shown) may be provided for mounting the device on an engine or other mechanism.

Located within filter element 28 is a temperature sensitive differentital pressure indicator assembly 30, which is threaded into the end of fluid bowl 18. The indicator assembly includes a housing 32 having a bore 33 therein, said bore having a small diameter portion 34 and a large diameter portion 36. A plug 38 is suitably attached to the large diameter end of housing 32, by means such as snap ring 40, and has a smaller bore 42 formed therein which contains indicator pin 44. The indicator pin, which has an annular groove 46 formed thereon, is slidable within bore 42 and is movable from a hidden first position (non-signalling position) to a visible second position (signalling position), as shown in FIGURE 2. A packing 48 is located between the indicator pin and bore 42 for frictionally engaging the wall of said bore. A plurality of locking balls 50 are located in groove 46 and are confined therein by a lock sleeve 52 which is urged against the plug 38 by a preloaded spring 54. Suitably connected to lock sleeve 52, by means such as retaining ring 56, is a piston member 58 which is slidable in the small diameter portion 34 of bore 33. A piston member 60 having an air bleed screw 61 threaded therein is also slidable in the small diameter portion 34 and forms chamber 62 with piston 58. Located within chamber 62 and between the two piston members is a partition 64 having an orifice 66 formed therein, said orifice permitting flow of fluid from one side of the partition to the other. Between piston member 58 and partition 64 is a light return spring 68, the function of which will be subsequently explained. Confined within the chamber 62 is a suitable temperature sensitive fluid medium capable of transmitting motion from one of the piston members to the other. Any of a number of fluid mediums may be used in this chamber, so long as the fluid solidifies at temperatures below a given desired value. Selection of the fluid will be dependent on the system pressures and the temperature ranges involved. For normal temperature and pressure ranges the fluid may be plain water or water plus a corrosion inhibitor. It has been found that for certain systems having extreme temperature ranges, in the magnitude of −65° F. to 400° F., Woods metal (.56 Bi, .22 Pb, .22 Sn) or similar metals which melt at approximately 100° F. may be used in chamber 62. It should be noted that the piston 60, which is a floating piston, serves to isolate the temperature sensitive fluid while capping expansion chamber 62. Filter inlet pressure is communicated to the large diameter portion 36 of bore 33 via passage 70 to act on piston member 58 and also on one end of indicator pin 44. Filter outlet pressure is communicated to the small diameter portion 34 of bore 33 via passage 72 to act on floating piston member 60. A stop pin 74 is fixedly secured to the open end of bore 33 to prevent overtravel of piston member 60 due to boiling of the fluid in chamber 62 at high temperatures.

Operation of the indicator is as follows: Flow through the filtering device, as indicated by the arrows in FIGURE 1, is from inlet port 12 through filter element 28 and out through outlet port 14. Filter inlet pressure is communicated to the lower side of piston member 58 via passage 70, while filter outlet pressure is communicated to the upper side of floating piston member 60 via passage 72. Since chamber 62 contains a fluid medium capable of transmitting forces from one piston member to the other, it will be understood that our device incorporates in effect a single pressure responsive means consisting of the two piston members 58 and 60 and the fluid in chamber 62, said pressure responsive means having the opposite sides thereof subjected to filter inlet and outlet pressures. Since the cross-sectional areas of both piston members are substantially equal, the pressure responsive means will accurately sense the differential pressure existing between the inlet and outlet ports. As long as the differential pressure between the inlet and outlet ports remains below a predetermined value, determined by the spring load of springs 54 and 68, the piston members 58 and 60 will not move; however, when the differential pressure is such that the spring load can be overcome, piston member 58 will move upwards toward partition 64 forcing the fluid in chamber 62 through orifice 66, which fluid in turn forces floating piston member 60 upwards toward stop pin 72. Such movement of piston 58 will cause lock sleeve 52 to also move upwardly to a position which will permit the locking balls 50 to move radially out of the indicator pin groove 46. Since the filter inlet pressure is also acting on the end of indicator pin 44, the pin will be moved to a visible position when the balls have moved out of the groove. When the system is shut down, the flow through the filter and the differential pressure will become zero. With the indicator pin 44 in the visible position, the lock sleeve 52 will be held against spring 54 by the extended pin and locking balls 50. However, the over-ride groove 53 will allow the spring 68 to return the piston 58 to its start position. Since the temperature sensitive fluid in chamber 62 has now been returned to its initial position, it is possible to manually reset the indicator pin and service the filter, even after the system temperature has dropped below the predetermined value required to solidify the fluid. It should be noted that the friction of the indicator pin packing 48 will hold the indicator pin in its visible position until the pin is manually re-set.

Differential pressures of a magnitude sufficient to overcome the predetermined preload of springs 54 and 68 may occur because of a clogged filter element or may result, for example, from the starting of a cold engine, at which time the flow of oil through the filter is relatively low and the viscosity of the cold oil is very high. In the second instance, although the filter would not be clogged, an indicator means controlled only by differential pressures would have indicated a clogged condition. In order to avoid such false readings, we have incorporated directly in the differential pressure responsive means a temperature control which will render it inoperative at temperatures below a predetermined value regardless of the magnitude of the differential pressure exerted thereon. More specifically, the temperature control consists of a fluid in chamber 62 which will solidify at temperatures below a predetermined value and thus be prevented from being forced through the orifice 66 in partition 64. Motion of piston members 58 and 60, therefore, will be prevented and the indicator pin will remain in a hidden or non-signalling position.

After the temperature of the system has risen above the predetermined value at which the fluid solidifies, the device will operate as previously described.

Although this invention has been described in connection with a specific embodiment, it is obvious to those skilled in the art that various changes may be made in the form, structure and arrangement of parts without departing from the spirit of the invention. Accordingly, we do not desire to be limited to the specific embodiment disclosed herein primarily for purposes of illustration, but instead desire protection falling within the scope of the appended claims.

Having thus described the various features of the invention, what we claim as new and desire to secure by Letters Patent is:

1. A temperature sensitive differential pressure indicating device comprising a housing having a first bore therein, a plug for closing one end of said first bore, said plug having a second bore therein, an indicator pin slidable within said second bore and movable from a hidden first position to a visible second position, said indicator pin having an annular groove formed thereon, a plurality of locking balls located in said groove for retaining said indicator pin in said hidden first position, a lock sleeve located in said second bore for confining said locking balls in said annular groove, a first piston member operatively connected to said lock sleeve and movable in said first bore for moving said lock sleeve to a position which will permit the balls to move radially out of said groove, spring means for opposing movement of said lock sleeve and first piston member, a second floating piston member movable in said first bore, said first and second piston members forming a chamber therebetween within said first bore, stop means located in said chamber for preventing contact between said first and second piston members, fluid temperature sensitive means confined in said chamber for transmitting motion from one of said piston members to the other, said stop means preventing transmittal of such motion at temperatures causing said fluid means to solidify, a first port for communicating one side of said first piston member and one end of said indicator pin with a first pressure, and a second port for communicating one side of said second piston member with a second pressure.

2. A temperature sensitive differential pressure indicating device comprising a housing having first and second bores therein, an indicator pin slidable in one of said bores and movable from a hidden first position to a visible second position, said indicator pin having a recess formed thereon, restraining means located in said recess for retaining said indicator pin in said hidden first position, a member for confining said restraining means in said recess, first piston means operatively connected to said member and movable in the other of said bores for moving said member to a position which will permit said restraining means to move out of said recess, means for opposing movement of said piston means, second piston means movable in the other of said bores, said first and second piston means forming a chamber therebetween, stop means located in said chamber for preventing contact between said first and second piston means, fluid means confined in said chamber for transmitting motion from one of said piston means to the other, said stop means preventing transmittal of such motion at temperatures causing said fluid means to solidify, first passage means for communicating one side of said first piston means and one end of said indicator pin with a first pressure, and second passage means for communicating one side of said second piston means with a second pressure.

3. A temperature sensitive differential pressure indicator comprising a housing having first and second bores therein, an indicator element located in said first bore and movable from a hidden first position to a visible second position, means urging said indicator element from said first to said second position, first and second piston members movable in said second bore, chamber means formed in said second bore by said first and second piston members, a fluid medium confined in said chamber for transmitting motion from one of said piston members to the other, a first port communicating with one side of said first piston member and a first pressure source, a second port communicating with the other side of said second piston member and a second pressure source, said first piston member being operatively connected to said indicator element and having a first position for preventing movement of said indicator element when differential pressures across said first and second piston members remain below a predetermined value and a second position for permitting movement of said indicator element when said differential pressures rise above a predetermined value, and stop means connected to said housing and positioned between said piston members for preventing contact therebetween, said stop means preventing movement of said first piston member from said first to said second position at temperatures causing said fluid medium to solidify.

4. A temperature sensitive differential pressure indicator comprising indicating means having signalling and non-signalling positions, means for restraining movement of said indicating means from said non-signalling to said signalling position, movable pressure responsive means operatively connected to said restraining means for releasing said indicating means from said restraining means when the differential pressure acting on said pressure responsive means exceeds a predetermined value, said pressure responsive means including a confined fluid medium operatively connected thereto for preventing movement thereof at temperatures causing said fluid medium to solidify, means for opposing movement of said pressure responsive means, a first port communicating with a first pressure, a second port communicating with a second pressure, and passage means communicating one of said ports with one side of said pressure responsive means and the other of said ports with the indicating means and the other side of said pressure responsive means.

5. A temperature sensitive differential pressure indicating device comprising indicating means movable from a first to a second position, passage means communicating said indicating means with one of two pressure sources thereby permitting pressure therefrom to urge said indicating means from said first to said second position, means for restraining movement of said indictaing means from said first to said second position, temperature sensitive differential pressure responsive means movably responsive to predetermined differential pressures occurring between said two pressure sources and operatively connected to said restraining means for moving said restraining means to a non-restraining position when differential pressures exceeding a predetermined value are exerted across said pressure responsive means, said pressure responsive means including temperature sensitive means for rendering said pressure responsive means immovable at predetermined temperatures.

6. A temperature sensitive differential pressure indicating device comprising an indicator having s signalling and non-signalling positions, means for urging said indicator toward the signalling position, means for normally holding said indicator in the non-signalling position, and temperature sensitive pressure responsive means movably responsive to predetermined differential pressures occurring between a first and second pressure source and operatively connected to said holding means for releasing said indicator at said predetermined differential pressures, said pressure responsive means including first and second movable members forming a chamber therebetween, a fluid medium confined in said chamber for transmitting motion from one of said members to the other, and means located in said chamber for preventing transmittal of such motion at temperatures causing said fluid medium to solidify.

7. A temperature sensitive differential pressure indicator comprising indicating means having signalling and non-signalling positions, means for urging said indicating means towards said signalling position, means for restraining movement of said indicating means from said non-signalling to said signalling postion, movable pressure responsive means operatively connected to said restraining means for releasing said indicating means from said restraining means when the differential pressure acting on said pressure responsive means exceeds a predetermined value, means for opposing movement of said pressure responsive means, first passage means communicating one side of said pressure responsive means with a first pressure source, second passage means communicating the other side of said pressure responsive means with a second pressure source, and temperature sensitive means including a confined substance having liquid and solid phases, said substance being operatively connected to said restraining means for preventing movement thereof at temperatures causing said substance to be in a solid phase.

8. A temperature sensitive differential pressure indicating device comprising indicating means having signalling and non-signalling positions, means for urging said indicating means toward the signalling position, means for normally holding said indicating means in the non-signalling position, pressure responsive means communicating with a first and second pressure source and being movably responsive to a predetermined pressure differential occurring therebetween, said pressure responsive means being operatively connected to said holding means for releasing said indicating means at said predetermined pressure differential, and temperature sensitive means including a confined substance having liquid and solid phases, said substance being operatively connected to said holding means for preventing release of said indicating means at temperatures causing said substance to be in a solid phase.

9. A temperature sensitive differential pressure indicating device comprising indicating means movable from a non-signalling to a signalling position, means for urging said indicating means towards the signalling position, movable differential pressure sensing means operatively connected to said indicating means for preventing movement of said indicating means to the signalling position at differential pressures below a predetermined value, and temperature sensitive means including a confined substance having liquid and solid phases, said substance being operatively connected to said differential pressure sensing means for preventing movement thereof at temperatures causing said substance to be in a solid phase.

10. A temperature sensitive differential pressure indicating device comprising signal means having signalling and non-signalling positions, means for moving said signal means from the non-signalling position to the signalling position, chamber means having pressure responsive means located therein, said pressure responsive means being operatively connected to said signal means for normally maintaining said signal means in its non-signalling position, first fluid passage means communicating one side of said pressure responsive means with a first fluid pressure source, second passage means communicating the other side of said pressure responsive means with a second fluid pressure source, said pressure responsive means being movable in response to changes in the differential pressure between said first and second fluid pressure source to release said signal means to its signalling position when said differential pressure exceeds a predetermined value, and temperature sensing means operatively connected to said pressure responsive means for rendering said pressure responsive means nonresponsive to the differential pressure exerted thereagainst at temperatures below a predetermined value.

11. A temperature sensitive differential pressure indicating device comprising indicating means movable from a non-signalling to a signalling position, holding means for maintaining said indicating means in one of said positions, said holding means having an operable and an inoperable position, pressure responsive means communicating with a first and second pressure source and being movably responsive to predetermined pressure differentials occurring therebetween, said pressure responsive means being operatively connected to said indicating means for controlling movement thereof from one position to the other at said predetermined pressure differentials, and temperature sensitive means including a confined substance having liquid and solid phases at predetermined temperatures, said substance being operatively connected to said holding means for preventing movement of said holding means from its operable position when said substance is in one of its phases and for permitting movement of said holding means to its inoperable position when said substance is in the other of its phases.

References Cited in the file of this patent

UNITED STATES PATENTS

| | | |
|---|---|---|
| 2,620,815 | Margraf et al. | Dec. 9, 1952 |
| 2,729,339 | McCoy | Jan. 3, 1956 |
| 2,786,437 | Oakes | Mar. 26, 1957 |
| 2,878,936 | Scavuzzo et al. | Mar. 24, 1959 |
| 2,935,040 | Steensen | May 3, 1960 |
| 2,942,572 | Pall | June 28, 1960 |
| 2,954,751 | Barnes | Oct. 4, 1960 |